United States Patent Office 3,580,874
Patented May 25, 1971

3,580,874
DYEABLE PILL-RESISTANT POLYESTERS
Akihiro Nishimura, Williamsburg, Va., assignor to Dow
Badische Company, Williamsburg, Va.
No Drawing. Filed July 16, 1969, Ser. No. 842,389
Int. Cl. C08f *11/02, 21/04;* C08g *17/00*
U.S. Cl. 260—22
15 Claims

ABSTRACT OF THE DISCLOSURE

Improved polyesters consist of the condensation product of a polyhydric alcohol, a major proportion of a first dibasic acid, a minor proportion of a long chain aliphatic dibasic acid having 28–44 carbon atoms, and a minor proportion of a long chain polyfunctional compound having 30–60 carbon atoms and at least three reactive sites.

BACKGROUND OF THE INVENTION

This invention relates to a polyester which is capable of forming films, fibers and filaments suitable for use in the textile industry. In one aspect, it relates to a polyester composition having improved dyeability with disperse dyes and improved pilling resistance. In another aspect, it relates to an improved polyethylene terephthalate.

Polyesters in recent years have been increasingly used in the textile industry. Filaments of the aromatic polyester resins, and particularly, polyethylene terephthalate, have found application not only in clothing, but also in areas where heavy wear is anticipated, such as in carpets. The production of fiber forming linear polyesters of terephthalic acid and an ethylene glycol has been disclosed by Whinfield and Dickson in U.S. Pat. 2,465,319. Fabrics produced from polyethylene terephthalate have become well accepted for their ease-of-care properties associated with fast drying, crease recovery, wrinkle resistance and abrasion resistance. However, these staple fibers have two large drawbacks in certain end uses. One is a phenomenon called "pilling" which is a term used to refer to the formation of many small fuzz balls caused by the entanglement of loose broken fibers. The other problem is a rather poor disperse dyeability which is caused by the highly crystalline and oriented structure of polyethylene terephthalate.

A number of attempts have been made to modify the molecular structure of polyesters in order to make these polymers more dye receptive. In general, these attempts have involved introducing non-crystallizable, flexible compounds into the esterification product in order to provide dye-receptive amorphous regions in the polyester molecules. In this regard, the use of polyalkylene oxide to modify polyesters was suggested in British Pat. 779,054. The use of a glycol from the dimer of a fatty acid was proposed in U.S. Pats. 2,347,562 and 3,091,600, and the use of the dibasic acid dimer of a fatty acid was proposed in U.S. 3,390,108.

These proposed modifications of the polyester molecule have not been entirely successful, however. The addition of polyalkylene oxide for example, causes the polymer to have much worsened light stability. Furthermore, the copolyesters formed from these long chain aliphatic compounds show a greatly reduced melt viscosity compared to the unmodified polyester. For example, the incorporation of 5 mol percent of the dimer of a fatty acid into polyethylene terephthalate has been shown to reduce the melt viscosity at 288° C. from 4500 poise to 2300 poise. While such a reduction is sometimes advantageous, in many instances it is necessary that sufficiently high melt viscosity be maintained in order that satisfactory spinning under practical conditions can take place.

It is, therefore, an object of this invention to modify polyesters in order to improve their disperse dyeability while maintaining a satisfactory melt viscosity and satisfactory light stability.

An additional problem faced by users of polyesters arises from the phenomenon called "pilling." Pills are formed when short, smooth fibers work their way through the fabric surface where they become entangled with each other. All types of synthetic fibers, including polyamides, acrylics and polyesters are subject to pilling, thus indicating that this defect is associated more with the physical properties of the fibers, such as strength, extensibility, smoothness and length rather than with the chemical structure. Most attempts to overcome the pilling problem have been directed at incorporating into the fabric suitable proportions of weakened fibers or fibers which are specially weakened during finishing or processing of the fabric. Because of these points of weakness in the textile fibers, the pills which form will be more easily brushed away and, in fact, if they can be removed as fast as they are formed, the pilling problem is overcome for all practical purposes.

It is, therefore, an object of this invention to produce a polyester fiber which is resistant to pill formation.

While many suggestions have been made for improving the pilling resistance of polyesters, just as many suggestions have been made for improving the disperse dyeability of polyesters, the improvements suggested to overcome one problem are rarely helpful, and are quite often harmful, to the solution of the other.

It is, therefore, a further object of this invention to produce a polyester which has both improved dispersed dyeability and improved pill resistance.

STATEMENT OF THE INVENTION

According to the invention, a polyester having improved disperse dyeability and good resistance to pill formation comprises structural units of
(1) A polyhydric alcohol
(2) A first dibasic acid of aromatic character
(3) A second dibasic acid which is a long chain aliphatic compound of 28 to 44 carbon atoms
(4) A polyfunctional compound reactable with the other components having 30 to 60 carbon atoms and at least three reactive sites.

The first dibasic acid is the major proportion of the acid component, comprising from 91.5 to 98.95 percent of the total acid. The second dibasic acid is from 1.0 to 7.0 mol percent. The polyfunctional compound comprises 0.05 to 1.5 mol percent of the total acids. (For purposes of calculation of proportions, the polyfunctional compound is considered as an acid component regardless of the nature of its terminal groups.)

PREFERRED EMBODIMENTS

The presently preferred embodiment of my invention is the polymer which is formed by esterifying ethylene glycol with terephthalic acid, the dicarboxylic acid 36 carbon atom dimer of a fatty acid, and the tricarboxylic acid 54 carbon atom trimer of a fatty acid. The amount of polyhydric alcohol used in the esterification reaction will be stoichiometrically calculated to esterify completely or substantially completely all of the carboxyl groups present in the reaction system from the total acids in the composition.

The major acid component in my composition is a dibasic acid of aromatic character. Any dibasic acid which will upon esterification produce a filament-forming resin can be used. The phthalic acids, and terephthalic acid in particular, are the most suitable for fiber forming compositions, as described in U.S. Pat. 2,465,319. This first acid is present in an amount from 91.5 to 98.95 mol percent, based upon the total acids present.

The second acid present in the system is a dibasic aliphatic acid having 28–44 carbon atoms. This acid is primarily responsible for the improvement in disperse dyeability of the finished composition. It is necessary that the second acid have a high molecular weight in order to avoid the serious depression of the melting point caused by low molecular weight copolymerizable acids. Depression of the melting point is proportional to the mol percent of the second acid component used, rather than the weight percent. Therefore, by using a high molecular weight second acid, a large weight percent of the second acid can be tolerated without substantial depression of the melting point. On the other hand, the improvement in disperse dyeability appears due to the weight percent of the second acid. Therefore, by using a small mol percent of a high molecular weight acid, I am able to improve the disperse dyeability without serious depression of the melting point.

Dibasic acids having 28–44 carbon atoms can be conveniently produced by the dimerization of the unsaturated aliphatic monocarboxylic acids having from 14–22 carbon atoms. These dimer acids are well-known in the art and are commercially available. The dimer acids are produced by dimerizing such aliphatic monocarboxylic acids as myristoleic, palmitoleic, oleic, linoleic, linolenic, elaeosteric, licanic, ricinoleic, erucic. These dimers may be used either alone or in combination with each other. The preferred dimer acid contains 36 carbon atoms, and is a commercially available product produced by the polymerization of unsaturated $C_{18}$ fatty acids, such as oleic, linoleic and linolenic acids. The preparation and structure of dimerized fatty acid is described in J.A.C.S. 66, 84 (1944) and in U.S. Pat. 2,347,562.

In order to avoid discoloration of the ultimate polymer, it is preferable that the dimer acid be saturated. This can be accomplished conveniently by hydrogenation of the dimer as taught in "Organic Functional Group Reactions," pages 5 and 6, by S. R. Sandler and W. Karo.

The polyfunctional compound which is used in compositions of my invention contains 30 to 60 carbon atoms and at least three terminal groups which will react with carboxylic or hydroxyl radicals so that the polyfunctional molecule will be incorporated into the polymer chain. These terminal reactive groups may, therefore, be hydroxyls, carboxylic aids, esters of carboxylic acids, isocyanates, or amines.

The purpose of the polyfunctional compound is to enhance the melt viscosity of the composition, thus counteracting the depression of melt viscosity which is inherent in introduction of the long chain dicarboxylic acid. The presence of the polyfunctional compound also serves to provide a point of brittleness in the molecule, thus permitting relatively easy breaking of the fibers and consequent resistance to pill formation.

Polyfunctional compounds having more than 30 carbon atoms are to be preferred. When shorter chain polyfunctional compounds are used, there is a serious problem of gel formation caused by the crosslinking through small molecules. Compounds containing about 50–60 carbon atoms appear to operate satisfactorily. In the currently preferred embodiment, I use a polyfunctional compound derived from a trimer of an 18 carbon atom fatty acid (54 carbon atoms). The tricarboxylic acid trimer of a $C_{18}$ fatty acid is commercially available, and is conveniently used in the practice of the invention. As noted above, however, the acid groups can be converted to hydroxyl or other reactive groups prior to use.

The polyfunctional compound is responsible for resistance of the polymer to pill formation. It is known that there is a close relationship between breaking tenacity and breaking elongation of the fiber. That is, the higher the breaking tenacity, the lower breaking elongation would be or vice versa. In order to achieve a low pill polyester, it is necessary that both breaking tenacity and elongation fall within a certain range. Test results have indicated that a fiber having a breaking tenacity of 1.5–3.0 g./d. and a breaking elongation of 15–30% will have satisfactory pill resistance. With regard to the commercial polyesters, and particularly, polyethylene terephthalate, this means that it is necessary to produce a fiber having lower than usual breaking tenacity without an increase in the breaking elongation. Under the usual spinning conditions, however, these properties are not achieved, with excessive breaking elongation normally resulting when the tenacity is reduced. However, I have found that introduction of a polyfunctional compound into the molecule permits control of breaking tenacity and elongation within the desired ranges.

The polyfunctional compound is present in my composition in a concentration range from about 0.05 to 1.5 mol percent based upon the total acid content. The optimum amount of polyfunctional compound to be used will vary depending upon the specific polyfunctional compound. In general, a lower content of more rigid molecules will be incorporated, whereas a larger content of the more flexible molecules can be tolerated. When using the trimer of a $C_{18}$ fatty acid, a concentration in the range of 0.1 to 1.0 mol percent is preferred. The use of saturated polyfunctional compounds is preferred.

As is understood in the art, it is possible to synthesize polyesters through several different routes. Thus, the polymers of my invention can be produced by the reaction of carboxylic acids with polyhydric alcohols and it will also be apparent that other reactions may be used to achieve a molecular structure identical to that produced by the acid-alcohol condensation. The claims to my invention are therefore directed to the ultimate chemical structure formed, regardless of the process used to produce the structure. As will be apparent from the examples below, a generally preferred process for the production of polyesters is the transesterification reaction between glycol and carboxylic acid esters.

EXAMPLE I 702 g. of bishydroxyethyl terephthalate, 82 g. bishydroxyethyl dimerate (ester of a dimer acid, $C_{36}$) and 12 g. trihydroxyethyl trimerate (ester of a trimer acid $C_{54}$) were placed in a stainless steel reaction vessel equipped with a stirrer, a distillation column, a series of cold traps and a nitrogen inlet.

An ethylene glycol solution of 0.65 g. antimony triacetate as a polycondensation catalyst and 0.85 g. of trinonyl phenyl phosphite as a heat stabilizer, were added when the reaction mixture melted.

The reaction mixture was heated under nitrogen while stirring until the temperature reached 285° C., then vacuum was applied slowly over a period of three hours. After the maximum vacuum of 0.01 mm. Hg was reached, the reaction mixture was held under this condition for an additional two hours.

The copolyester thus formed had a melt viscosity of 4100 poise at 288° C.

The melting point, as determined by differential scanning colorimeter, was 250° C.

EXAMPLLE 2

A copolyester with 97.5/2.0/0.5 ethylene terephthalate/ ethylene dimerate/ethylene trimerate (mole percent) was prepared in the same manner as described in Example 1. The spun fiber was dyed in the absence of a carrier and the dyeability was found to be better than that of a polyethylene terephthalate homopolymer control dyed with a carrier. The fiber had a breaking tenacity of 2.9 g./d., breaking elongation 21%.

EXAMPLE 3

A series of polymers was prepared from ethylene glycol, terephthalic acid, $C_{36}$ dimer acid and $C_{54}$ trimer acid in a similar manner to the process of Example I. Table I shows properties of filaments prepared from these polymers compared to two samples of pure polyethylene terephthalate.

TABLE I.—COMPOSITIONS OF COPOLYESTERS CONTAINING DIMER ACID AND TRIMER ACID

|  | I | II | III | IV | V | VI | VII |
|---|---|---|---|---|---|---|---|
| Terephthalic acid (percent) | 95.5 | 97.5 | 95.0 | 93.2 | 100 | 100 | 97.5 |
| Dimer acid (percent) | 4.3 | 2.0 | 4.0 | 5.6 | 0 | 0 | 2.3 |
| Trimer acid (percent) | 0.9 | 0.5 | 1.0 | 1.2 | 0 | 0 | 0.2 |
| IV [1] | 0.71 | 0.72 | 0.74 | 0.70 | 0.66 | 0.66 | 0.69 |
| Draw ratio | 3.1 | 3.2 | 2.7 | 2.1 | 3.0 | 4.3 | 3.1 |
| Breaking tenacity (g./d.) | 2.7 | 2.9 | 2.3 | 1.8 | 2.8 | 5.2 | 3.0 |
| Breaking elongation (percent) | 18 | 21 | 16 | 15 | 68 | 19 | 28 |
| M.P. (° C.) | 250 | 254 | 252 | 246 | 261 | 261 | 251 |

[1] IV was measured from phenol/tetrachloroethane (60/40) solvent, all percentages are mole percent based on total acid used.

What is claimed is:

1. A filament-forming polyester comprising structural units of
   (A) A glycol,
   (B) polycarboxylic acids consisting essentially of:
       (1) 91.5 to 98.95 mol percent of a first dibasic aromatic acid,
       (2) 1.0 to 7.0 mol percent of a second dibasic acid having 28 to 44 carbon atoms, and
   (C) 0.05% to 1.5% of a polyfunctional compound having 30 to 60 carbon atoms and at least 3 reactive groups selected from hydroxyl, carboxylic acid, carboxylic acid ester, isocyanate and amine.

2. The polyester of claim 1 wherein said second dibasic acid has 36 carbon atoms.

3. The polyester of claim 1 wherein said second dibasic acid is the dimer of a fatty acid.

4. The polyester of claim 1 wherein said second dibasic acid is the dimer of an 18 carbon atom fatty acid.

5. The polyester of claim 1 wherein said second dibasic acid is dioleic, dilinoleic or dilinolenic acid.

6. The polyester of claim 1 wherein said polyfunctional compound is a tribasic acid.

7. The polyester of claim 1 wherein said polyfunctional compound has 50 to 60 carbon atoms.

8. The polyester of claim 1 wherein said polyfunctional compound is a tribasic acid of 54 carbon atoms.

9. The polyester of claim 1 wherein said polyfunctional compound is the trimer of a fatty acid.

10. The polyester of claim 1 wherein said polyfunctional compound is the trimer of an 18 carbon atom fatty acid.

11. The polyester of claim 1 wherein said polyfunctional compound is the trimer of oleic, linoleic or linolenic acid.

12. The polyester of claim 1 wherein said first dibasic acid is terephthalic acid.

13. The polyester of claim 1 wherein said polyhydric alcohol is ethylene glycol.

14. The polyester of claim 1 wherein said second dibasic acid is the dimer of a fatty acid and said polyfunctional compound is the trimer of a fatty acid.

15. A filament-forming copolyester comprising structural units of:
   (A) 91.5 to 98.95 mol percent of terephthalic acid, 1.0 to 7.0 mol percent of the saturated dimer of an 18 carbon atom fatty acid, 0.05 to 1.5 mol percent of the saturated trimer of an 18 carbon atom fatty acid, and
   (B) ethylene glycol.

References Cited

UNITED STATES PATENTS

| | | | |
|---|---|---|---|
| 3,091,600 | 5/1963 | Caldwell et al. | 260—75 |
| 3,256,304 | 6/1966 | Fischer et al. | 260—407 |
| 3,311,578 | 3/1967 | Laakso | 260—22 |
| 3,383,343 | 5/1968 | Mohajer et al. | 260—22 |
| 3,390,108 | 6/1968 | Keck et al. | 260—7.5 |
| 3,461,468 | 8/1969 | Morgan et al. | 8—165 |

FOREIGN PATENTS

| | | | |
|---|---|---|---|
| 745,690 | 11/1966 | Canada | 260—75 |

OTHER REFERENCES

Emery Industries, Inc., specification and characteristics of Emery Fatty Acids and Organic Chemicals, EY-OF-736, June 1966, 1–20.

DONALD E. CZAJA, Examiner

R. W. GRIFFIN, Assistant Examiner

U.S. Cl. X.R.

8—179; 161—169; 260—75